(12) United States Patent
Carew (10) Patent No.: US 6,526,046 B1
(45) Date of Patent: Feb. 25, 2003

(54) SYSTEM AND METHOD FOR COMMUNICATING TELECOMMUNICATION INFORMATION USING ASYNCHRONOUS TRANSFER MODE

(75) Inventor: A. J. Paul Carew, Austin, TX (US)

(73) Assignee: General Bandwidth Inc., Austin, TX (US)

(*) Notice: Subject to any disclaimer, the term of this patent is extended or adjusted under 35 U.S.C. 154(b) by 0 days.

(21) Appl. No.: 09/841,931

(22) Filed: Apr. 24, 2001

(51) Int. Cl.[7] .............................. H04L 12/56; H04J 3/24; H04J 3/12; H04M 11/00
(52) U.S. Cl. ....................... 370/352; 370/398; 370/474; 370/522; 379/93.14; 379/93.28
(58) Field of Search ................................. 370/352, 356, 370/395, 398, 399, 410, 474, 476, 465, 466, 469, 522; 379/93.14, 93.07, 93.28

(56) References Cited

U.S. PATENT DOCUMENTS

| | | | |
|---|---|---|---|
| 4,381,427 A | 4/1983 | Cheal et al. ............. 179/2 DP |
| 4,493,092 A | 1/1985 | Adams ...................... 375/36 |
| 4,504,942 A | 3/1985 | Aro et al. ................... 370/58 |
| 4,507,793 A | 3/1985 | Adams ...................... 375/36 |
| 4,512,025 A | 4/1985 | Frankel et al. .............. 375/36 |
| 4,578,537 A | 3/1986 | Faggin et al. ............ 179/2 DP |
| 4,608,686 A | 8/1986 | Barsellotti ................ 370/69.1 |
| 4,627,046 A | 12/1986 | Bellamy ...................... 370/58 |
| 4,740,963 A | 4/1988 | Eckley .................... 370/110.1 |
| 4,748,656 A | 5/1988 | Gibbs et al. ................. 379/93 |
| 4,853,949 A | 8/1989 | Schorr et al. ................ 379/2 |
| 4,881,226 A | 11/1989 | Lechner et al. .......... 370/110.1 |
| 4,903,292 A | 2/1990 | Dillion ....................... 379/93 |
| 5,033,062 A | 7/1991 | Morrow et al. ................. 375/7 |
| 5,034,948 A | 7/1991 | Mizutani et al. ............... 370/79 |
| 5,042,028 A | 8/1991 | Ogawa ...................... 370/58.2 |
| 5,127,003 A | 6/1992 | Doll, Jr. et al. .......... 370/110.1 |
| 5,134,611 A | 7/1992 | Steinka et al. ................ 370/79 |
| 5,142,568 A | 8/1992 | Ogata et al. ................. 379/100 |
| 5,142,571 A | 8/1992 | Suzuki et al. ............... 379/279 |
| 5,151,923 A | 9/1992 | Fujiwara ......................... 375/5 |
| 5,216,704 A | 6/1993 | Williams et al. .............. 379/93 |
| 5,220,560 A | 6/1993 | Ogasawara ................... 370/79 |
| 5,267,300 A | 11/1993 | Kao et al. ..................... 379/93 |

(List continued on next page.)

FOREIGN PATENT DOCUMENTS

| | | | |
|---|---|---|---|
| EP | 0 841 831 A2 | 5/1998 | ........... H04Q/11/04 |
| GB | 2313979 A | 12/1997 | .......... H04M/11/06 |
| WO | WO97/23078 | 6/1997 | ........... H04L/12/56 |

(List continued on next page.)

OTHER PUBLICATIONS

Unknown Author, "B–ISDN ATM Adapter Layer (AAL) Specification," ITU–T Telecommunication Standardization Sector of ITU, Integrated Services Digital Network (ISDN) Overall Network Aspects and Functions, ITU–T Recommendation 1.363, 100 pages, Mar. 1993.

(List continued on next page.)

Primary Examiner—Wellington Chin
Assistant Examiner—M. Phan
(74) Attorney, Agent, or Firm—Baker Botts L.L.P.

(57) ABSTRACT

A gateway for communicating telecommunication information between a telecommunication network and customer premises equipment includes a telecommunication interface and a packetization module. The telecommunication interface receives first telecommunication information for a first subscriber and second telecommunication information for a second subscriber. The packetization module generates first ATM cells for communicating the first telecommunication information using a first ATM adaptation layer associated with the first subscriber and generates second ATM cells for communicating the second telecommunication information using a second ATM adaptation layer associated with the second subscriber

18 Claims, 3 Drawing Sheets

U.S. PATENT DOCUMENTS

| | | | |
|---|---|---|---|
| 5,305,312 A | 4/1994 | Fornek et al. | 370/62 |
| 5,317,627 A | 5/1994 | Richardson, Jr. et al. | 379/88 |
| 5,349,640 A | 9/1994 | Dunn et al. | 379/387 |
| 5,410,343 A | 4/1995 | Coddington et al. | 348/7 |
| 5,426,692 A | 6/1995 | Fujise | 379/93 |
| 5,448,635 A | 9/1995 | Biehl et al. | 379/399 |
| 5,459,788 A | 10/1995 | Kim | 379/399 |
| 5,473,675 A | 12/1995 | Chapman et al. | 379/93 |
| 5,479,447 A | 12/1995 | Chow et al. | 375/260 |
| 5,499,241 A | 3/1996 | Thompson et al. | 370/73 |
| 5,509,007 A * | 4/1996 | Takashima et al. | 370/352 |
| 5,535,198 A | 7/1996 | Baker et al. | 370/60 |
| 5,604,737 A | 2/1997 | Iwami et al. | 370/352 |
| 5,606,553 A | 2/1997 | Christie et al. | 370/394 |
| 5,610,992 A | 3/1997 | Balatoni | 370/468 |
| 5,613,069 A | 3/1997 | Walker | 395/200.15 |
| 5,617,423 A | 4/1997 | Li et al. | 370/426 |
| 5,625,685 A | 4/1997 | Allegranza et al. | 379/399 |
| 5,638,363 A | 6/1997 | Gittins et al. | 370/358 |
| 5,661,785 A | 8/1997 | Carpenter et al. | 379/93.15 |
| 5,668,857 A | 9/1997 | McHale | 379/93.07 |
| 5,671,251 A | 9/1997 | Blackwell et al. | 375/222 |
| 5,673,290 A | 9/1997 | Cioffi | 375/260 |
| 5,675,575 A | 10/1997 | Wall, Jr. et al. | 370/326 |
| 5,719,870 A | 2/1998 | Baker et al. | 370/463 |
| 5,737,333 A | 4/1998 | Civanlar et al. | 370/352 |
| 5,771,236 A | 6/1998 | Sansom et al. | 370/458 |
| 5,781,547 A | 7/1998 | Wilson | 370/395 |
| 5,781,617 A | 7/1998 | McHale et al. | 379/93.14 |
| 5,784,371 A | 7/1998 | Iwai | 370/397 |
| 5,787,088 A | 7/1998 | Dagdeviren et al. | 370/493 |
| 5,805,588 A | 9/1998 | Petersen | 370/356 |
| 5,809,022 A * | 9/1998 | Byers et al. | 370/395 |
| 5,828,666 A | 10/1998 | Focsaneanu et al. | 370/389 |
| 5,838,682 A | 11/1998 | Dekelbaum et al. | 370/401 |
| 5,841,840 A | 11/1998 | Smith et al. | 379/93.01 |
| 5,848,150 A | 12/1998 | Bingel | 379/399 |
| 5,864,747 A | 1/1999 | Clark et al. | 455/3.2 |
| 5,881,142 A | 3/1999 | Frankel et al. | 379/167 |
| 5,883,941 A | 3/1999 | Akers | 379/93.08 |
| 5,889,773 A | 3/1999 | Stevenson, III | 370/352 |
| 5,889,856 A | 3/1999 | O'Toole et al. | 379/399 |
| 5,896,377 A | 4/1999 | Boot et al. | 370/352 |
| 5,898,761 A | 4/1999 | McHale et al. | 379/93.01 |
| 5,901,205 A | 5/1999 | Smith et al. | 379/93.01 |
| 5,905,781 A * | 5/1999 | McHale et al. | 379/93.14 |
| 5,917,814 A | 6/1999 | Balatoni | 370/352 |
| 5,940,479 A | 8/1999 | Guy et al. | 379/93.01 |
| 5,943,339 A * | 8/1999 | Mauger | 370/397 |
| 5,943,404 A | 8/1999 | Sansom et al. | 379/93.06 |
| 5,949,763 A | 9/1999 | Lund | 370/261 |
| 5,978,390 A | 11/1999 | Balatoni | 370/540 |
| 5,999,529 A * | 12/1999 | Bernstein et al. | 370/376 |
| 5,999,565 A | 12/1999 | Locklear, Jr. et al. | 375/222 |
| 5,999,598 A | 12/1999 | Henrick et al. | 379/93.07 |
| 6,009,100 A * | 12/1999 | Gausmann et al. | 370/397 |
| 6,018,517 A | 1/2000 | Bengio et al. | 370/233 |
| 6,021,136 A * | 2/2000 | Bharucha et al. | 370/477 |
| 6,041,054 A * | 3/2000 | Westberg | 370/389 |
| 6,041,064 A * | 3/2000 | Kurdzo et al. | 370/466 |
| 6,049,531 A | 4/2000 | Roy | 370/260 |
| 6,075,784 A | 6/2000 | Frankel et al. | 370/356 |
| 6,081,517 A | 6/2000 | Liu et al. | 370/352 |
| 6,088,365 A * | 7/2000 | Kurdzo et al. | 370/466 |
| 6,128,301 A * | 10/2000 | Bernstein | 370/396 |
| 6,130,879 A | 10/2000 | Liu | 370/230 |
| 6,141,339 A * | 10/2000 | Kaplan et al. | 370/352 |
| 6,169,735 B1 * | 1/2001 | Allen, Jr. et al. | 370/352 |
| 6,169,738 B1 * | 1/2001 | Sriram et al. | 370/395 |
| 6,172,973 B1 * | 1/2001 | Akhtar et al. | 370/354 |
| 6,181,715 B1 | 1/2001 | Phillips et al. | 370/493 |
| 6,256,323 B1 * | 7/2001 | Benayoun et al. | 370/474 |
| 6,259,699 B1 * | 7/2001 | Opalka et al. | 370/398 |
| 6,266,343 B1 * | 7/2001 | Caves | 370/466 |
| 6,282,191 B1 * | 8/2001 | Cumberton et al. | 370/352 |
| 6,345,056 B1 * | 2/2002 | Bharucha et al. | 370/474 |
| 6,381,246 B1 * | 4/2002 | Constantinof et al. | 370/410 |

FOREIGN PATENT DOCUMENTS

| | | | |
|---|---|---|---|
| WO | WO 97/37458 | 10/1997 | |
| WO | WO 99/49608 | 9/1999 | |
| WO | WO 01/06720 | 1/2001 | H04Q/11/04 |
| WO | WO 01/13593 A1 | 2/2001 | H04L/12/46 |
| WO | WO 01/13618 A1 | 2/2001 | H04M/11/06 |

OTHER PUBLICATIONS

Unknown Author, "Circuit Emulation Service Interoperability Specification, Version 2.0" The ATM Forum Technical Committee, af–vtoa–0078.000, 43 pages, Jan. 1997.

Unknown Author, "Voice and Telephony Over ATM to the Desktop Specification" The ATM Forum Technical Committee, af–vtoa–0083.000, 43 pages, May 1997.

Unknown Author, "Specifications of (DBCES) Dynamic Bandwidth Utilization—In 64KBPS Time Slot Trunking Over ATM—Using CES" The ATM Forum Technical Committee, AF–VTOA–0085.000, 36 pages, Jul. 1997.

Unknown Author, "Voice and Telephony Over ATM—ATM Trunking using AAL1 for Narrowband Services, Version 1.0," The ATM Forum Technical Committee, AF–VTOA–0089.000, 64 pages, Jul. 1997.

T. Rybczynski, "Voice Networking Over ATM in the Wan," http://www.atmforum.com/pages/library/53bytes/current/article–52–03.html, 3 pages, Aug. 10, 2001.

A.A. Azzam, "A Closer Look at ATM over DSL," http://www.atmforum.com/pages/library/53bytes/current/article–03.html, 3 pages, Aug. 7, 2001.

G. Onyszchuk, "Will Voice Take Over ATM?," atmforum.com/pages/library/53bytes/backissues/others/53bytes–1095–3.html, 4 pages, Aug. 7, 2001.

R. Forkish, "1994–Year of the ATM WAN," atmforum.com/pages/library/53bytes/backissues/other/53bytes–1094–3.html, 8 pages, Aug. 7, 2001.

D. Rehana, "ATM, the Multiservice Medium," http://www-.telecoms–mag.com/issues/199711/tci/rehana.html, 7 pages, Nov. 1997.

L. Van Hauwermeiren, et al., "Offering Video Services over Twisted Pair Cables to the Residential Subscriber by means of an ATM based ADSL Transmission System," ISS Symposium, vol. 1, 5 pages, Apr. 1995.

T.C. Kwok, "Residential Broadband Architecture Over ADSL and G.Lite (G.992.2): PPP Over ATM," XP–000830885, IEEE Communication Magazine, 6 pages, May 1999.

Notification of Transmittal of the International Search Report or the Declaration, 7 pages, May 2, 2001.

Notification of Transmittal of the International Search Report or the Declaration, 7 pages, Jun. 29, 2001.

PCT International Search Report, 7 pages, Feb. 5, 2001.

Gudapati, et al., "Local Telephone Service for Cable Subcribers Using Packet Switched Access," ISS. World Telecommunications Congress, pp. 325–329, Sep. 21, 1997.

"B–ISDN ATM Adaptation layer specification: Type 2 AAL," International Telecommunication Union, I.363.2, Series I: Integrated Services Digital Network, Overall network aspects and functions—Protocol layer, p. 84, Sep. 1997.

"B–ISDN ATM Adaptation layer specification: Type 5 AAL," International Telecommunication Union, I.363.2, Series I: Integrated Services Digital Network, Overall network aspects and function—Protocol layer, pp. 67, Aug. 1996.

"ATM Trunking using AAL2 for Narrowband Services," The ATM Forum Technical Committee, AF–V-TOA–0113.000, pp. 58, Feb. 1999.

* cited by examiner

SYSTEM AND METHOD FOR COMMUNICATING TELECOMMUNICATION INFORMATION USING ASYNCHRONOUS TRANSFER MODE

TECHNICAL FIELD OF THE INVENTION

This invention relates generally to the field of communications and, more particularly, to a system and method for communicating telecommunication information using asynchronous transfer mode (ATM).

BACKGROUND OF THE INVENTION

The public switched telephone network is a circuit-switched network that uses dedicated lines to communicate telephone calls. At a central office, a digital Class 5 switch receives analog telephone signals from a user, digitizes the analog telephone signals, and then multiplexes the digital signals over a network of circuit-switched backbone transport lines. An interexchange carrier (IXC) transports the call to a destination Local Access and Transport Area (LATA), where it is handed to a local service provider and reconverted to an analog signal for delivery to a second user.

New broadband communication protocols, such as ATM, have emerged that allow the delivery of telephone calls using data packets. Although ATM Adaptation Layer type 2 (AAL2) is best suited for delay sensitive applications, such as communicating voice or other telecommunication information to customer premises, many broadband service providers do not support end-to-end AAL2 service to customer premises. As a result, this lack of support for AAL2 quality-of-service has hindered widespread deployment of voice over ATM.

SUMMARY OF THE INVENTION

In accordance with the present invention, a system and method for communicating telecommunication information using ATM is provided that substantially eliminates or reduces disadvantages or problems associated with previously developed systems and methods.

In one embodiment, a gateway for communicating telecommunication information between a telecommunication network and customer premises equipment includes a telecommunication interface and a packetization module. The telecommunication interface receives first telecommunication information for a first subscriber and second telecommunication information for a second subscriber. The packetization module generates first ATM cells for communicating the first telecommunication information using a first ATM adaptation layer associated with the first subscriber and generates second ATM cells for communicating the second telecommunication information using a second ATM adaptation layer associated with the second subscriber.

In another embodiment, a gateway for communicating telecommunication information between a telecommunication network and customer premises equipment receives telecommunication information from the telecommunication network for communication to the customer premises equipment. The gateway generates AAL2 information encapsulating the telecommunication information, generates ATM cells encapsulating the AAL2 information, sets a field in each ATM cell to indicate that each cell includes an end of a data unit, and communicates the ATM cells to the customer premises equipment.

The present invention provides a number of important technical advantages. Unlike previous techniques, the present invention provides a gateway that communicates telecommunication information using alternative ATM adaptation layers. As a result, if a broadband distribution platform between the gateway and a subscriber's customer premises equipment supports end-to-end AAL2 service, gateway 18 may communicate the subscriber's telecommunication information using AAL2. But, if the broadband distribution platform does not support AAL2, the gateway may communicate the subscriber's telecommunication information using AAL5 or any other suitable AAL type. In addition, if AAL2 is not available, the gateway may communicate the subscriber's telecommunication information using a hybrid AAL2/5 that provides significant advantage over AAL5. For these and other readily apparent reasons, the present invention represents a significant advance over prior art systems and methods.

DETAILED DESCRIPTION OF THE DRAWINGS

Figure 1:
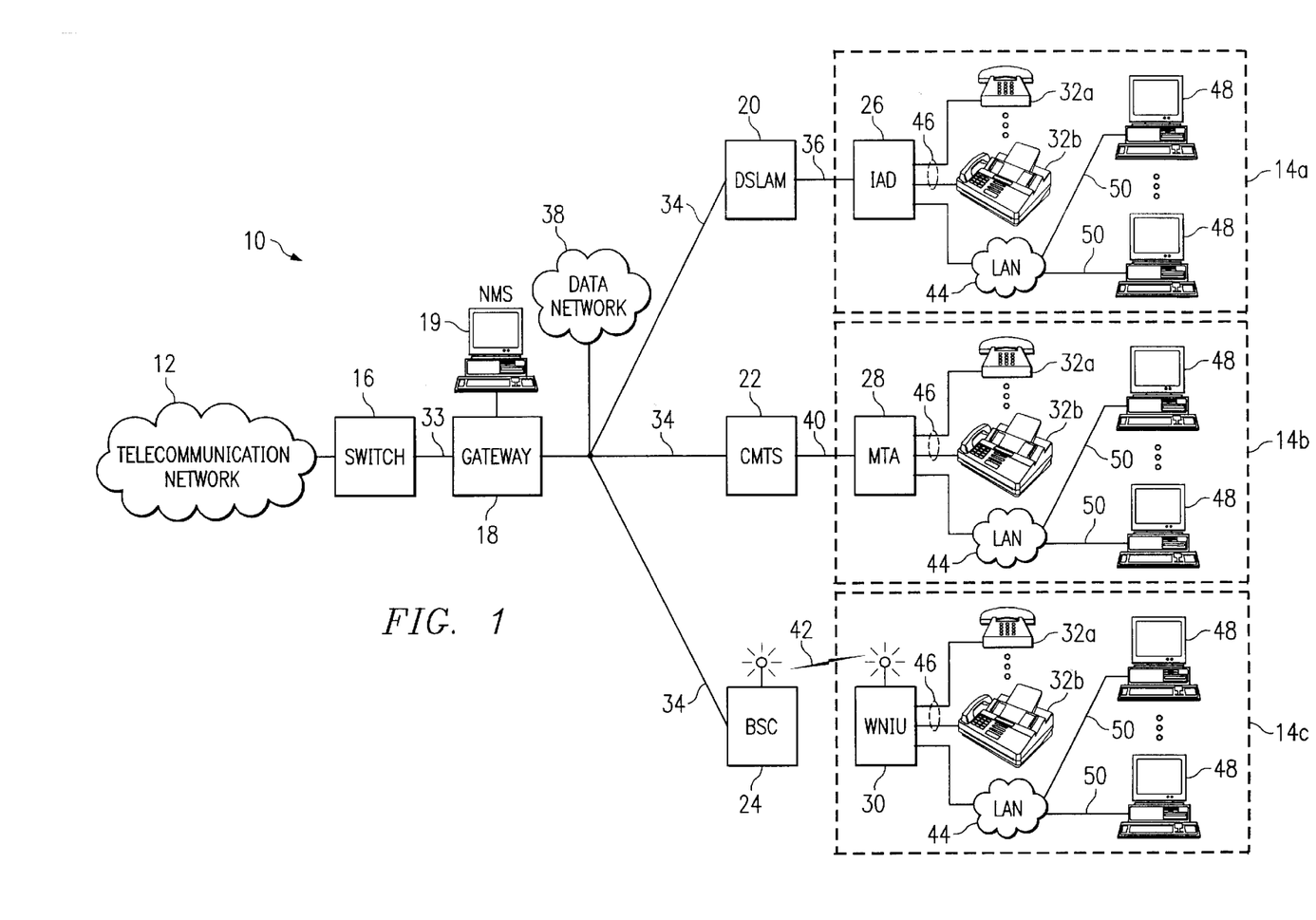
FIG. 1 illustrates a system that communicates telecommunication information between a telecommunication network and customer premises equipment using alternative adaptation layers.

FIG. 1 illustrates a system 10 that communicates telecommunication information between a telecommunication network 12 and customer premises equipment 14a, 14b, and 14c (collectively, customer premises equipment 14) using alternative ATM adaptation layers. System 10 includes a switch 16, a gateway 18, a digital subscriber line access multiplexer (DSLAM) 20, a cable modem termination system (CMTS) 22, a base station controller (BSC) 24, an integrated access device (IAD) 26, a media terminal adapter (MTA) 28, a wireless network interface unit (WNIU) 30, and terminal devices 32a and 32b (terminal devices 32).

Telecommunication network 12 may be a public switched telephone network, a private switched telephone network, or any other interconnected collection of telecommunication switches that provide local, regional, long distance, or international telephone service. Telecommunication information may include voice, data, image, video, or any other type of information that can be communicated using telecommunication network 12.

Telecommunication switch 16 communicates telecommunication information between telecommunication network 12 and gateway 18. Switch 16 may be a class 4 switch, a class 5 switch, or any other suitable device that communicates telecommunication information with telecommunication network 12.

Gateway 18 performs various compression and protocol conversions to communicate telecommunication information between switch 16 and customer premises equipment 14. To communicate telecommunication information with switch 16, gateway 18 uses GR-303, TR-8, signal system 7

(SS7), V5, integrated services digital network (ISDN) lines, unbundled analog lines, or any other suitable telecommunication interface 33. To communicate telecommunication information with customer premises equipment 14 using a broadband distribution platform, gateway 18 generates ATM cells encapsulating the telecommunication information and communicates the ATM cells using DS-1 lines, DS-3 lines, OC-3 lines, or any other suitable data link 34. In addition, to facilitate efficient communication of telecommunication information with customer premises equipment 14, gateway 18 may compress and de-compress telecommunication information using various compression algorithms. Gateway 18 also may selectively perform echo cancellation on the telecommunication information to isolate and filter unwanted noise. As described in further detail below with reference to FIG. 2, gateway 18 may receive configuration information from a network management system (NMS) 19 or customer premises equipment 14.

System 10 uses a digital subscriber line (DSL), cable, wireless, satellite, or any other suitable broadband distribution platform to communicate ATM cells encapsulating telecommunication information between gateway 18 and customer premises equipment 14. Using DSL technology, DSLAM 20 and IAD 26 communicate ATM cells over local loop circuit 36. CMTS 22 and MTA 28 communicate ATM cells over cable link 40, and BSC 24 and WNIU 30 communicate ATM cells over wireless link 42. Although not illustrated in FIG. 1, data switches, routers, or other data communication equipment may communicate ATM cells between gateway 18 and DSLAM 20, CMTS 22, and BSC 24.

DSLAM 20 and IAD 26 communicate ATM cells encapsulating telecommunication information between gateway 18 and customer premises equipment 14a using DSL technology. DSLAM 20 receives ATM cells from gateway 18, processes the ATM cells to generate DSL data, and communicates the DSL data to IAD 26 using local loop circuit 36. IAD 26 receives the DSL data from local loop circuit 36, identifies ATM cells including telecommunication information for terminal devices 32, and communicates the telecommunication information to terminal devices 32. In a particular embodiment, IAD 26 processes the identified ATM cells to generate analog telephone signals and communicates the analog telephone signals to terminal devices 32 using subscriber lines 46. In an alternative embodiment, IAD 26 communicates the ATM cells to terminal devices 32, and terminal devices 32 process the ATM cells to access the telecommunication information.

DSLAM 20 and IAD 26 also communicate telecommunication information from terminal devices 32 to gateway 18. In a particular embodiment, IAD 26 receives analog telephone signals communicating telecommunication information from subscriber lines 46 and processes the analog telephone signals to generate ATM cells encapsulating the telecommunication information. In an alternative embodiment, IAD 26 receives ATM cells encapsulating telecommunication information from subscriber lines 46. IAD 26 processes the ATM cells to generate DSL data and communicates the DSL data to DSLAM 20 using local loop circuit 36. DSLAM 20 receives the DSL data from IAD 26 using local loop circuit 36, identifies ATM cells for delivery to gateway 18, and communicates the identified ATM cells to gateway 18. Asymmetric DSL (ADSL), integrated DSL (IDSL), symmetric DSL (SDSL), high data rate DSL (HDSL), rate-adaptive DSL (RADSL), very-high data rate DSL (VDSL), DSL-LITE, or other forms of DSL technology allow data transmissions over local loop circuit 36 at greater speeds than offered by traditional dial-up modems. As a result, by using DSL technology, system 10 may support broadband, telecommunication services over local loop circuit 36.

In a particular embodiment, DSLAM 20 and LAD 26 also communicate ATM cells between data network 38 and local-area network (LAN) 44. Data network 38 may be a wide-area network (WAN), the Internet, or any other interconnected collection of switches, routers, or other data communication equipment that provides data services. DSLAM 20 receives ATM cells from data network 38, processes the ATM cells to generate DSL data, and communicates the DSL data to LAD 26 using local loop circuit 36. LAD 26 receives the DSL data from local loop circuit 36, identifies ATM cells for delivery to LAN 44, and communicates the identified ATM cells to LAN 44. IAD 26 also receives ATM cells from LAN 44 for delivery to data network 38, processes the ATM cells to generate DSL data, and communicates the DSL data to DSLAM 20 using local loop circuit 36. DSLAM 20 receives the DSL data from local loop circuit 36, identifies ATM cells for delivery to data network 38, and communicates the identified ATM cells to data network 38.

CMTS 22 and MTA 28 communicate ATM cells encapsulating telecommunication information between gateway 18 and customer premises equipment 14b using a cable distribution platform. CMTS 22 receives ATM cells from gateway 18, processes the ATM cells for communication over cable link 40, and communicates the ATM cells to MTA 28 using cable link 40. MTA 28 receives the ATM cells from cable link 40, identifies ATM cells including telecommunication information for terminal devices 32, and communicates the telecommunication information to terminal devices 32. In a particular embodiment, MTA 28 processes the identified ATM cells to generate analog telephone signals and communicates the analog telephone signals to terminal devices 32 using subscriber lines 46. In an alternative embodiment, MTA 28 communicates the ATM cells to terminal devices 32, and terminal devices 32 process the ATM cells to access the telecommunication information.

CMTS 22 and MTA 28 also communicate telecommunication information from terminal devices 32 to gateway 18. In a particular embodiment, MTA 28 receives analog telephone signals communicating telecommunication information from subscriber lines 46 and processes the analog telephone signals to generate ATM cells including the telecommunication information. In an alternative embodiment, MTA 28 receives ATM cells encapsulating telecommunication information from subscriber lines 46. MTA 28 processes the ATM cells for communication over cable link 40 and communicates the ATM cells to CMTS 22 using cable link 40. CMTS 22 receives the ATM cells from MTA 28 using cable link 40, identifies ATM cells for delivery to gateway 18, and communicates the identified ATM cells to gateway 18. CMTS 22 and MTA 28 communicate data over cable link 40 at greater speeds than offered by traditional dial-up modems, and as a result, system 10 may support broadband, telecommunication services over cable link 40.

In a particular embodiment, CMTS 22 and MTA 28 also communicate ATM cells between data network 38 and LAN 44. CMTS 22 receives ATM cells from data network 38, processes the ATM cells for communication over cable link 40, and communicates the ATM cells to MTA 28 using cable link 40. MTA 28 receives the ATM cells from cable link 40, identifies ATM cells for delivery to LAN 44, and communicates the identified ATM cells to LAN 44. MTA 28 also receives ATM cells from LAN 44 for delivery to data network 38, processes the ATM cells for communication over cable link 40, and communicates the ATM cells to CMTS 22 using cable link 40. CMTS 22 receives the ATM cells from cable link 40, identifies ATM cells for delivery to data network 38, and communicates the identified ATM cells to data network 38.

BSC 24 and WNIU 30 communicate ATM cells encapsulating telecommunication information between gateway 18 and customer premises equipment 14c using a wireless distribution platform. BSC 24 receives ATM cells from gateway 18, processes the ATM cells for wireless communication, and communicates the ATM cells to WNIU 30 using wireless link 42. WNIU 30 receives the ATM cells from wireless link 42, identifies ATM cells including telecommunication information for terminal devices 32, and communicates the telecommunication information to terminal devices 32. In a particular embodiment, WNIU 30 processes the identified ATM cells to generate analog telephone signals and communicates the analog telephone signals to terminal devices 32 using subscriber lines 46. In an alternative embodiment, WNIU 30 communicates the ATM cells to terminal devices 32, and terminal devices 32 process the ATM cells to access the telecommunication information.

BSC 24 and WNIU 30 also communicate telecommunication information from terminal devices 32 to gateway 18. In a particular embodiment, WNIU 30 receives analog telephone signals communicating telecommunication information from subscriber lines 46 and processes the analog telephone signals to generate ATM cells including the telecommunication information. In an alternative embodiment, WNIU 30 receives ATM cells encapsulating telecommunication information from subscriber lines 46. WNIU 30 processes the ATM cells for wireless communication and communicates the ATM cells to BSC 24 using wireless link 42. BSC 24 receives the ATM cells from WNIU 30 using wireless link 42, identifies ATM cells for delivery to gateway 18, and communicates the identified ATM cells to gateway 18. BSC 24 and WNIU 30 communicate ATM cells over wireless link 42 at greater speeds than offered by traditional dial-up modems, and as a result, system 10 may support broadband, telecommunication services over wireless link 42.

In a particular embodiment, BSC 24 and WNIU 30 also communicate ATM cells between data network 38 and LAN 44. BSC 24 receives ATM cells from data network 38, processes the ATM cells for wireless communication, and communicates the ATM cells to WNIU 30 using wireless link 42. WNIU 30 receives ATM cells from wireless link 42, identifies ATM cells for delivery to LAN 44, and communicates the identified ATM cells to LAN 44. WNIU 30 also receives ATM cells from LAN 44 for delivery to data network 38, processes the ATM cells for wireless communication, and communicates the ATM cells to BSC 24 using wireless link 42. BSC 24 receives the ATM cells from WNIU 30 using wireless link 42, identifies ATM cells for delivery to data network 38, and communicates the identified ATM cells to data network 38.

Terminal devices 32 may include analog or digital telephones 32a, facsimile machines 32b, or any other suitable device that communicates telecommunication information using telecommunication network 12. And each subscriber line 46 may support one or more terminal devices 32 and may couple to terminal devices 32 using wireline, wireless, or any other suitable communication path. Personal computers (PCs), network computers (NCs), personal digital assistants, or any other suitable data communication device 48 may communicate data packets with LAN 44 using wireline, wireless, or any other suitable links 50.

Gateway 18, DSLAM 20, CMTS 22, BSC 24, IAD 26, MTA 28, and WNIU 30 communicate telecommunication information using an ATM architecture that includes an ATM layer and an ATM adaptation layer (AAL). The ATM layer establishes connections and communicates ATM cells according to control information in the header of each ATM cell. AAL enhances services provided by the ATM layer to support functions required by the higher-level protocols. Unlike previous systems and methods, gateway 18 communicates telecommunication information using several alternative AAL types.

AAL type 5 (AAL5) supports both connection-oriented and connectionless data communications. AAL5 transfers AAL Service Data Units (AAL-SDUs) from one AAL Service Access Point (AAL-SAP) to another AAL-SAP through an ATM network. A Segmentation and Reassembly (SAR) sublayer receives a variable length SAR Service Data Unit (SAR-SDUs), which is an integral multiple of 48 octets, and generates one or more SAR Protocol Data Units (SAR-PDUs) containing 48 octets of SAR-SDU data. The SAR sublayer uses an ATM-User-to-ATM-User indication (AUU) parameter of the ATM layer primitives to indicate whether an SAR-PDU contains the end of a SAR-SDU. An SAR-PDU, where the value of the AUU parameter is "0," includes the beginning or continuation of an SAR-SDU, and an SAR-PDU, where the value of the AUU parameter is "1," includes the end of an SAR-SDU. The Payload Type (PT) field in an ATM cell header conveys the value of the AUU parameter end-to-end, so the SAR-SDUs may be reassembled at their destination.

When communication becomes congested, a network device (such as DSLAM 20, CMTS 22, or BSC 24) discards SAR-SDUs one at a time to relieve the congestion. By examining the PT fields of ATM cells, the network device identifies the ATM cells that together encapsulate a single SAR-SDU. To discard one SARSDU, the network device discards all consecutive cells with the PT field set to "0" until it reaches a cell with the PT field set to "1," which is also discarded. The cells with the PT field set to "0" include the beginning or continuation of a SAR-SDU, and the cell with the PT field set to "1" is the end of that SAR-SDU. If communication is still congested, the network device discards the next SAR-SDU using the same process; otherwise, the device continues communicating ATM cells in a normal mode of operation. AAL5 is described in the International Telecommunication Union-Telecommunication Standardization Sector (ITU-T) Recommendation I.363.5.

AAL type2 (AAL2) supports the bandwidth-efficient transmission of low-rate, short, and variable length packets in delay sensitive applications and, thus, is better suited for communicating voice and other telecommunication information in applications such as system 10. Like AAL5, AAL2 provides the capabilities to transfer an AAL Service Data Unit (AAL-SDU) from one AAL Service Access Point (AAL-SAP) to another AAL-SAP through an ATM network. AAL2 is described in ITU-T Recommendation I.363.2. Unfortunately, although AAL2 is better suited for communicating telecommunication information, many DSL, cable, wireless and other broadband distribution platforms do not support end-to-end AAL2 service to customer premises equipment 14. To accommodate broadband distribution platforms that may support AAL5 but not AAL2, gateway 18 can selectively communicate telecommunication information using AAL2, AAL5, or a hybrid AAL2/5.

To communicate telecommunication information using the hybrid AAL2/5, gateway 18 generates ATM cells encapsulating the telecommunication information according to the AAL2 specification but sets the PT field in the ATM cells to "1" as if each ATM cell were communicating an AAL5 SAR-PDU that includes the end of an SAR-SDU. As a result, a network device that supports AAL5 but not AAL2 (such as DSLAM 20, CMTS 22, or BSC 24) will treat the cells as if each cell encapsulated a separate SAR-SDU according to AAL5. This treatment accords the cells substantial benefits in the event of congestion, in which case the network device will discard one cell at a time until the congestion is alleviated. In contrast, if the PT field were set to "0," the device would continually discard cells in search of a cell with the PT field set to "1," and such behavior could cause gateway 18 to lose its connection with IAD 26 severely impede performance, or introduce significant and undesirable delays.

Although FIG. 1 illustrates switch 16, gateway 18, DSLAM 20, CMTS 22, and BSC 24 as separate devices, the present invention contemplates that system 10 may include any combination of one or more devices at one or more locations that communicate telecommunication information between telecommunication network 12 and customer premises equipment 14 using alternative AAL types. For example, in an alternative embodiment, a single device may perform the operations associated with gateway 18 and DSLAM 20, gateway 18 and CMTS 22, or gateway 18 and BSC 24.

Figure 2:
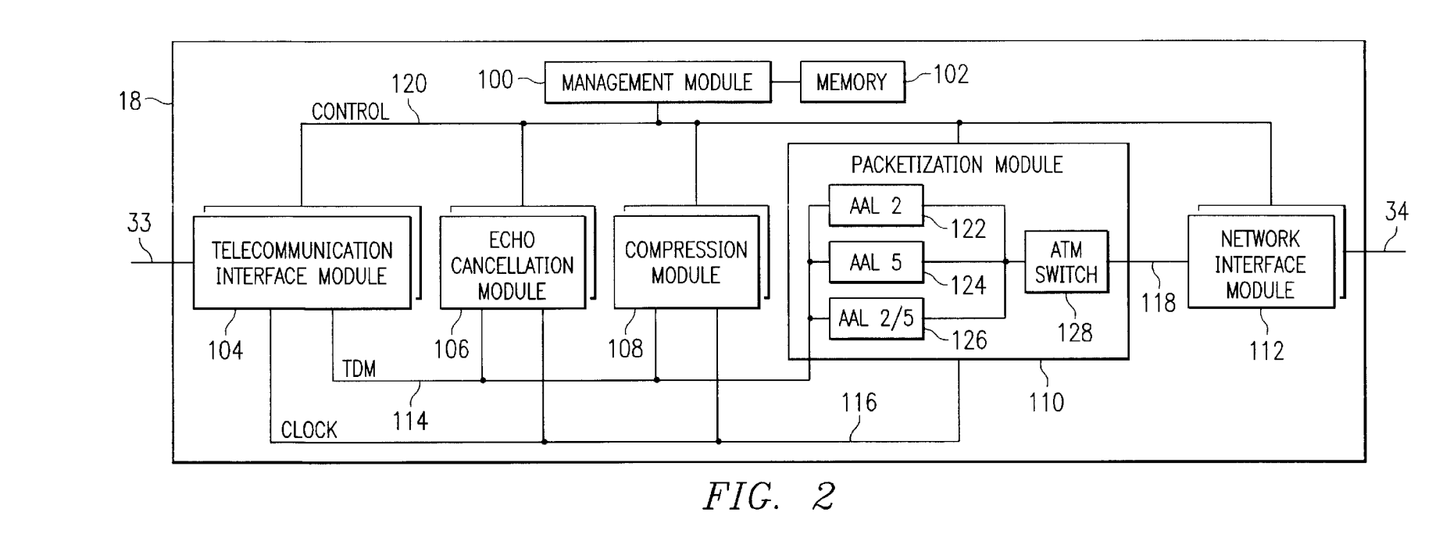
FIG. 2 illustrates a gateway that communicates telecommunication information using alternative ATM adaptation layers.

FIG. 2 illustrates gateway 18 that communicates telecommunication information using AAL2, AAL5, or a hybrid AAL2/5. Gateway 18 includes management module 100, memory 102, telecommunication interface modules (TIMs) 104, echo cancellation modules 106, compression modules 108, a packetization module 110, and network interface modules 112. Management module 100, TIMs 104, echo cancellation modules 106, compression modules 108, packetization module 110, and network interface modules 112 represent functional elements that are reasonably self-contained so that each may be designed, constructed, and updated substantially independent of the others. In a particular embodiment, management module 100, TIMs 104, echo cancellation modules 106, compression modules 108, packetization module 110, and network interface modules 112 are implemented on separate printed circuit boards that may be coupled to a backplane in gateway 18.

In the illustrated embodiment, a time division multiplexing (TDM) bus 114, an ATM bus 118, and a control bus 120 communicate telecommunication information, ATM cells, and control information within gateway 18. TDM bus 114 communicates several streams of telecommunication information among TIMs 104, echo cancellation modules 106, compression modules 108, and packetization module 110. A clock signal 116 divides TDM bus 114 into a fixed sequence of time slots, and each stream of telecommunication information is assigned a different time slot in the sequence. In a particular embodiment, management module 100 assigns 64 kilobits per second (kb/s) time slots to each subscriber serviced by gateway 18 and stores subscriber profiles associating the assigned time slots with the subscribers in memory 102. Management module 100 may provision TDM bus 114 at start-up of gateway 18 to support fixed time slot assignments or during operation of gateway 18 to support dynamic time slot assignments. ATM bus 118 communicates ATM cells between packetization module 110 and network interface modules 112, and control bus 120 communicates control information between management module 100 and TIMs 104, echo cancellation modules 106, compression modules 108, packetization module 110, and network interface modules 112.

Although the particular embodiment of gateway 18 described with reference to FIG. 2 includes three different busses 114, 118, and 120, gateway 18 may use any combination of dedicated or shared communication paths to communicate telecommunication information, ATM cells, and control information among modules 100, 104, 106, 108, 110, and 112. For example, in an alternative embodiment, a hybrid bus (such as an IEEE 802.6 bus) communicates telecommunication information between TIMs 104, echo cancellation modules 106, compression modules 108, and packetization modules 110 and also communicates ATM cells between packetization modules 110 and network interface modules 112.

To configure gateway 18, management module 100 selects a combination of TIMs 104, echo cancellation modules 106, compression modules 108, packetization module 110, and network interface modules 112 to service each subscriber and establishes a communication path for each subscriber among the selected combination of TIMs 104, echo cancellation modules 106, compression modules 108, packetization module 110, and network interface modules 112. In the illustrated embodiment, management module 100 assigns each subscriber one or more time slots in TDM bus 114 for communicating telecommunication information among TIMs 104, echo cancellation modules 106, compression modules 108, and packetization module 110. To implement the configuration, management module 100 may communicate control information to TIMs 104, echo cancellation modules 106, compression modules 108, packetization module 110, and network interface modules 112 using control bus 120. Management module 100 may statically configure gateway 18 at start-up or dynamically configure gateway 18 in response to receiving a telephone call from telecommunication network 12 or customer premises equipment 14.

In addition, management module 100 configures packetization module 110 by selecting AAL5, AAL2, AAL2/5 or other AAL type for communications. Management module 10 may select an AAL type for a communication based on the equipment supporting the communication or the bandwidth needed to support the communication. In a particular embodiment, management module 100 selects an ATM adaptation layer for each subscriber based on configuration information received from DSLAM 20, CMTS 22, BSC 24, LAD 26, MTA 28, or WNIU 30 during negotiation, training, or setup. For example, based on negotiation, training, or setup information, management module 100 may determine whether the broadband distribution platform between gateway 18 and a subscriber's customer premises equipment 14 supports end-to-end AAL2 service. If the broadband distribution platform supports end-to-end AAL2 service, management module 100 may select AAL2 for the subscriber. On the other hand, if DSLAM 20 or IAD 26 does not support AAL2, management module 100 may select AAL5 or AAL2/5 for the subscriber. In an alternative embodiment, gateway 18 selects an ATM adaptation layer according to the content or priority of a communication or the bandwidth needed to support the communication. For example, gateway 18 may select AAL2 or AAL2/5 for a voice call or other bandwidth sensitive communication and select AAL5 for data communications or other applications less sensitive to delay. As a result, a subscriber may have several protocol preferences which are selected according to the content of a communication session.

Management module 100 stores in memory 102 subscriber information associating the subscribers with the selected ATM adaptation layers. During operation, packetization module 110 may directly access the subscriber information stored in memory 102, or management module 100 may communicate to packetization module 110 control information identifying the ATM adaptation layer associated with a subscriber. Although memory 102 appears internal to gateway 18 in FIG. 2, memory 102 may be internal to or external from gateway 18 according to particular needs.

TIMs 104 communicate telecommunication information with switch 16 using several, alternative interfaces 33. Each TIM 104 may communicate telecommunication information using either a single type of interface 33 or several, different types of interfaces 33. During configuration, TIMs 104 receive control information identifying subscribers' interfaces 33 and assigned time slots in TDM bus 114. Once configured, TIMs 104 receive telecommunication information for subscribers from interfaces 33, process the telecommunication information for communication using TDM bus 114, and communicate the telecommunication information to the subscribers' assigned time slots in TDM bus 114. TIMs 104 also receive telecommunication information from subscribers' time slots in TDM bus 114, process the telecommunication information according to the subscribers' corresponding interfaces 33, and communicate the telecommunication information to switch 16 using the subscribers' corresponding interfaces 33.

In a particular embodiment, one of TIMs 104 communicates analog telephone signals with switch 16 using unbundled analog lines. In such an embodiment, TIM 104 receives analog telephone signals communicating telecommunication information from switch 16, processes the analog telephone signals to generate digital telecommunication information, and communicates the digital telecommunication information to TDM bus 114. TIM 104 also receives digital telecommunication information from TDM bus 114, generates analog telephone signals for communicating the telecommunication information, and communicates the analog telephone signals to switch 16 using unbundled analog lines. In an alternative embodiment, TIMs 104 communicates digital telecommunication information with switch 16 using GR-303, TR-8, SS7, or other suitable digital interface.

Echo cancellation modules 106 selectively perform echo cancellation on telecommunication information to isolate and filter unwanted noise. During configuration, echo cancellation modules 106 receive, from management module 100, control information identifying telecommunication information on which echo cancellation modules 106 should perform echo cancellation. In a particular embodiment, the control information identifies subscribers' assigned time slots in TDM bus 114. Once configured, echo cancellation modules 106 receive telecommunication information from TDM bus 114, perform echo cancellation on the telecommunication information, and communicate the telecommunication information back to TDM bus 114.

Compression modules 108 compress and de-compress telecommunication information using several, alternative compression algorithms. During configuration, compression modules 108 receive, from management module 100, control information identifying telecommunication information that compression modules 108 should compress or de-compress. In a particular embodiment, the control information identifies subscribers' assigned time slots in TDM bus 114. Once configured, compression modules 108 receive telecommunication information from TIMs 104 or echo cancellation modules 106 using TDM bus 114, compress the telecommunication information, and communicate the compressed telecommunication information to packetization module 110 using TDM bus 114. Compression modules 108 also receive compressed telecommunication information from packetization module 110 using TDM bus 114, de-compress the telecommunication information, and communicate the de-compressed telecommunication information to TIMs 104 or echo cancellation modules 106 using TDM bus 114.

Compression modules 108 may compress and de-compress telecommunication information using G.711, G.722, G.723, G.726, G.728, G.729, or any other suitable compression algorithm. In a particular embodiment, each compression module 108 supports a separate compression algorithm. In an alternative embodiment, each compression module 108 supports several, different compression algorithms and compresses or de-compresses a subscriber's telecommunication information using a compression algorithm selected according to control information received from management module 100.

Packetization module 110 communicates subscribers' telecommunication information using ATM. Unlike prior systems, packetization module 110 includes an AAL2 module 122, an AAL5 module 124, an AAL2/5 module 126, and an ATM switch 128. In alternative embodiments, packetization module 110 may include any number of modules to support additional ATM adaptation layers. AAL2 module 122 generates ATM cells encapsulating subscribers' telecommunication information according to the AAL2 specification described in ITU-T Recommendation I.363.2, and AAL5 module 124 generates ATM cells encapsulating subscribers' telecommunication information according to the AAL5 specification described in ITU-T Recommendation I.363.5. AAL2/5 module 126 generates ATM cells encapsulating telecommunication information using the hybrid AAL2/5 process described above, which involves encapsulating AAL2 information in ATM cells with the PT field set to "1." ATM switch 128 communicates ATM cells between AAL modules 122, 124, and 126 and network interface modules 112. AAL modules 122, 124, and 126 and ATM switch 128 may be implemented using hardware, software, or both hardware and software. In a particular embodiment, AAL modules 122, 124, and 126 are implemented using shared hardware components, such as one or more processors.

Packetization module 110 generates ATM cells according to the subscriber information stored in memory 102. Packetization module 110 receives telecommunication information from a subscriber's assigned time slot in TDM bus 114 and generates ATM cells encapsulating the telecommunication information according to the ATM adaptation layer associated with the subscriber in memory 102. If the subscriber is associated with AAL2 in memory 102, AAL2 module 122 generates ATM cells encapsulating the subscriber's telecommunication information according to the AAL2 specification described in ITU-T Recommendation I.363.2. If the subscriber is associated with AAL5, AAL5 module 124 generates ATM cells encapsulating the subscriber's telecommunication information according to the AAL5 specification described in ITU-T Recommendation I.363.5. If the subscriber is associated with AAL2/5, AAL2/5 module 126 generates ATM cells encapsulating the subscriber's telecommunication information using the hybrid AAL2/5 process. ATM switch 128 communicates the ATM cells generated by AAL modules 122, 124, or 126 to network interface modules 112.

Packetization module 110 also receives ATM cells from network interface modules 112. ATM switch 112 communicates the ATM cells to AAL modules 122, 124, or 126 according to the destination addresses of the cells. AAL modules 122, 124, and 126 extract telecommunication information from the cells, identify a subscriber associated with the telecommunication information, and communicate the telecommunication information to TDM bus 114 using the subscriber's assigned time slot in TDM bus 114. AAL modules 122, 124, and 126 may identify the subscriber based on the source or destination address of the ATM cells or a subscriber identifier included in the ATM cells.

Network interface modules 112 communicate ATM cells between packetization module 110 and data links 34. Network interface modules 112 may be coupled to DS-1 lines, DS-3 lines, OC-3 lines, or any other suitable data links 34. Network interface modules 112 receive ATM cells from packetization modules 110 and communicate the ATM cells to data links 34. Network interface modules 112 also receive ATM cells from data links 34 and communicate the ATM cells to packetization modules 110. In a particular embodiment, each network interface module 112 supports a single data link 34. In an alternative embodiment, each network interface module 112 supports several, alternative data links 34, and network interface modules 112 communicate ATM cells to data links 34 selected according to either the cells' destination address or control information received from management module 100.

Although the particular embodiment of gateway 18 described in detail with reference to FIG. 2 includes management module 100, memory 102, TIMs 104, echo cancellation modules 106, compression modules 108, packetization module 110, and network interface modules 112, gateway 18 may include any combination of hardware, software, or hardware and software that communicates telecommunication information using AAL2, AAL5, or AAL2/5.

Figure 3:
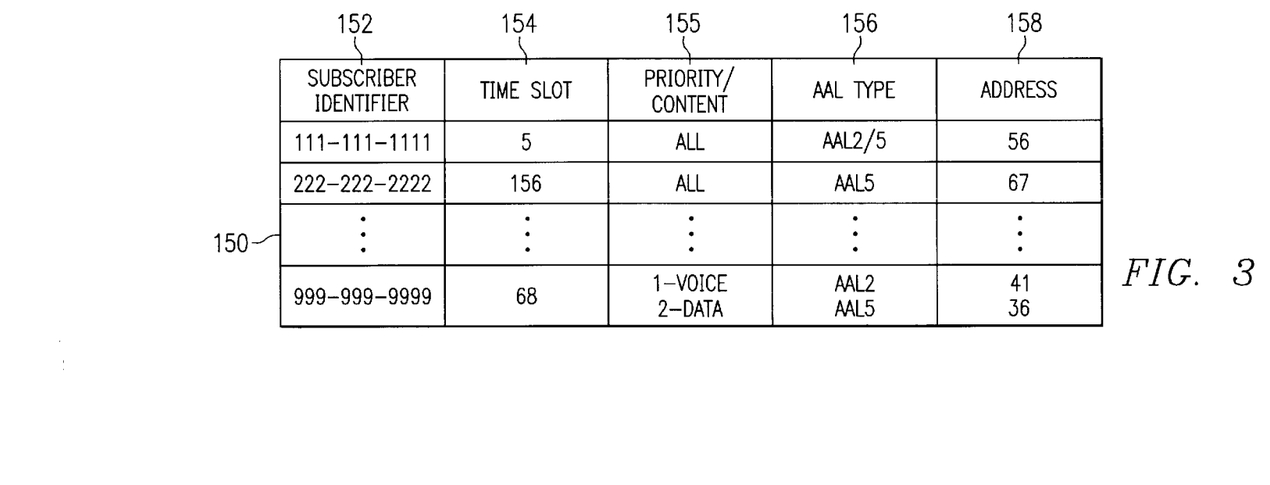
FIG. 3 illustrates a table of subscriber information used to communicate telecommunication information using alternative ATM adaptation layers.

FIG. 3 illustrates a table 150 of subscriber information used to communicate telecommunication information using alternative ATM adaptation layers. In table 150, each row is a separate subscriber profile including subscriber information for a particular subscriber serviced by gateway 18. Column 152 identifies subscribers serviced by gateway 18. Although the subscriber identifiers in column 152 are numbers, gateway 18 may use names, addresses, telephone numbers, or any other suitable information to identify the subscribers serviced by gateway 18. Columns 154, 156, and 158 associate each subscriber in column 152 with a time slot in TDM bus 114, an ATM adaptation layer, and an ATM address, respectively. In a particular embodiment, gateway 18 may associate different types of communications with different time slots, ATM adaptation layers, or ATM addresses. For example, table 150 uses column 155 to distinguish communications based on content and priority level, as indicated in the last row. Although FIG. 3 illustrates the subscriber information in the form of table 150, the subscriber information may be stored using arrays, linked lists, pointers, or any other suitable data programming techniques.

Gateway 18 may generate and store the subscriber information in memory 102. In a particular embodiment, management module 100 configures gateway 18 at start-up, in response to adding new customer premises equipment 14 or new subscribers to system 10, or in response to altering the configuration of existing customer premises equipment 14 or existing subscribers. Management module 100 receives configuration information from NMS 19 or customer premises equipment 14, generates the subscriber information based on the configuration information, and stores the subscriber information in memory 102. In an alternative embodiment, management module 100 dynamically configures gateway 18 in response to the initiation of a communication session. For example, in response to receiving a communication for a subscriber at telecommunication network 12 or customer premises equipment 14, management module 100 selects an ATM adaptation layer according to the content or priority of the communication.

Using the subscriber information in table 150, packetization module 110 communicates telecommunication information using alternative ATM adaptation layers. When packetization module 110 receives telecommunication information from a time slot in TDM bus 114, packetization module 110 identifies the subscriber profile in table 150 associated with the time slot using column 154. Packetization module 110 generates ATM cells for communicating the telecommunication information using the associated ATM adaptation layer in column 156, assigns the ATM cells the subscriber's destination address identified in column 158, and communicates the ATM cells to network interface modules 112 for further communication to the subscriber's customer premises equipment 14. When packetization module 110 receives an ATM cell from network interface modules 112, packetization module 110 identifies a subscriber profile in table 150 associated with the ATM cell. In a particular embodiment, packetization module 110 identifies a subscriber profile associated with the ATM cell's source or destination address using column 158. In an alternative embodiment, packetization module 110 identifies a subscriber profile associated with a subscriber identifier in the ATM cell using column 152. Packetization module 110 extracts telecommunication information from the ATM cell and communicates the telecommunication information to TDM bus 114 using the associated time slot in column 154.

Although a particular type of subscriber profile is described with reference to FIG. 3, gateway 18 may operate using many alternative types of subscriber information. For example, in an alternative embodiment of table 150, each row may be a separate customer premises profile including subscriber information associated with customer premises equipment 14 serviced by gateway 18. In addition, gateway 18 may use the subscriber information in many alternative ways. For example, in a particular embodiment, packetization module 110 may directly access subscriber information stored in memory 102. In an alternative embodiment, management module 100 accesses the subscriber information stored in memory 102 and communicates control information to packetization module 110 in accordance with the subscriber information.

Figure 4:
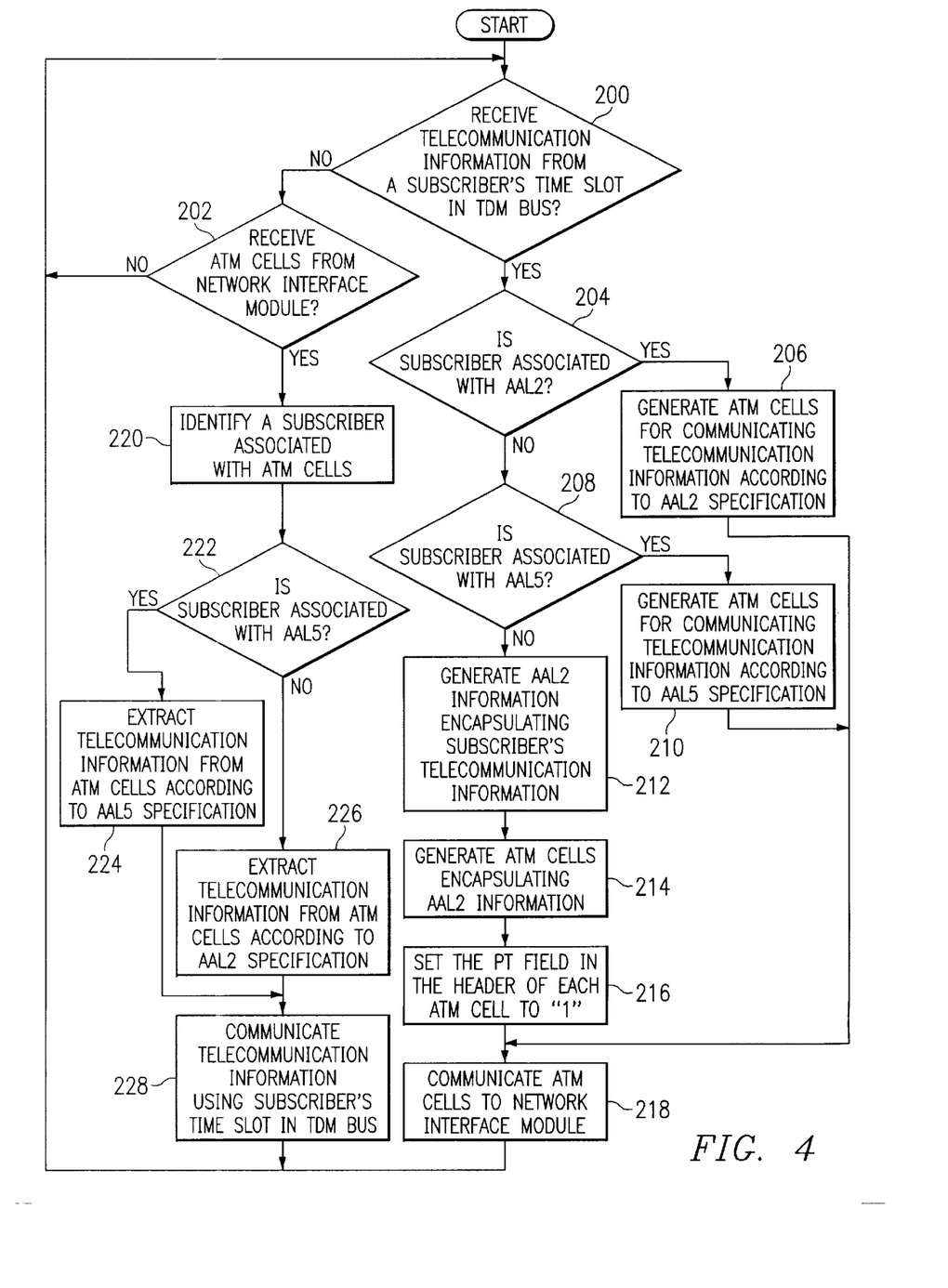
FIG. 4 is a flowchart of a method of communicating telecommunication information using alternative ATM adaptation layers.

FIG. 4 is a flowchart of a method of communicating telecommunication information using alternative ATM adaptation layers. The method begins when packetization module 110 receives either telecommunication information from TDM bus 114 at step 200 or ATM cells from network interface module 112 at step 202. If packetization module 110 receives telecommunication information from a subscriber's time slot in TDM bus 114 at step 200, the method continues at step 204, and if packetization module 110 receives ATM cells from network interface modules 112 at step 202, the method continues at step 220.

At step 204, packetization module 110 determines whether the subscriber is associated with AAL2. In a particular embodiment, packetization module 110 makes this determination based on control information received from management module 100, and in an alternative embodiment, packetization module 110 makes this determination based on subscriber information stored in memory 102. If the subscriber is associated with AAL2, AAL2 module 122 generates ATM cells for communicating the subscriber's telecommunication information according to an AAL2 specification at step 206, and the method continues at step 218. If the subscriber is not associated with AAL2, the method continues at step 206.

At step 206, packetization module 110 determines whether the subscriber is associated with AAL5. As described above, packetization module 110 may make this determination based on control information received from management module 100 or subscriber information stored in memory 102. If the subscriber is associated with AAL5, AAL5 module 124 generates ATM cells for communicating the subscriber's telecommunication information according to an AAL5 specification at step 210, and the method continues at step 218. If the subscriber is not associated with AAL5, the method continues at steps 212.

At steps 212–216, AAL2/5 module 126 generates ATM cells for communicating the subscriber's telecommunication information according to the AAL2/5 hybrid. AAL2/5 module 126 generates AAL2 information encapsulating the subscriber's telecommunication information at step 212 and generates ATM cells encapsulating the AAL2 information at step 214. AAL2/5 module 126 sets the PT field in the header of each ATM cell to "1" at step 216.

At step 218, ATM switch 128 communicates the ATM cells to network interface module 112 for further communication to the subscriber's customer premises equipment 14, and the method continues at step 200.

At step 220, packetization module 110 identifies a subscriber associated with the ATM cells received from network interface module 114. In a particular embodiment, packetization module 110 identifies the subscriber based on the ATM cells' destination or source ATM address. Packetization module 110 determines whether the identified subscriber is associated with AAL5 at step 222. Packetization module 110 may make this determination based on control information received from management module 100 or subscriber information stored in memory 102. If the subscriber is associated with AAL5, then AAL5 module 124 extracts telecommunication information from the ATM cells according an AAL5 specification at step 224 and communicates the telecommunication information using the subscriber's time slot in TDM bus 114 at step 228. If the subscriber is not associated with AAL5, then AAL2 module 122 or AAL2/5 module 126 extracts the telecommunication information from the ATM cells according to an AAL2 specification and communicates the telecommunication information using the subscriber's time slot in TDM bus 114 at step 228. The method continues at step 200.

Although FIG. 4 illustrates a particular method of communicating telecommunication information, the present invention encompasses other methods of using alternative ATM adaptation layers. For example, instead of associating each subscriber with a single ATM adaptation layer, gateway 18 may associate a subscriber with several ATM adaptation layers and select one according to the type, content, priority, bandwidth requirements, or other criteria of a communication.

Although an embodiment of the invention and its advantages are described in detail, a person skilled in the art could make various alterations, additions, and omissions without departing from the spirit and scope of the present invention as defined by the appended claims.

What is claimed is:

1. A gateway for communicating telecommunication information between a telecommunication network and customer premises equipment, the gateway comprising:

a telecommunication interface operable to receive first telecommunication information for a first subscriber and second telecommunication information for a second subscriber; and a packetization module operable to generate first ATM cells for communicating the first telecommunication information using a first ATM adaptation layer associated with the first subscriber and to generate second ATM cells for communicating the second telecommunication information using a second ATM adaptation layer associated with the second subscriber, wherein the first ATM adaptation layer is AAL2 and the second ATM adaptation layer is a hybrid AAL2/5.

2. The gateway of claim 1, further comprising a management module operable to associate the first subscriber with AAL2 in response to determining that a first broadband distribution platform between the gateway and the first subscriber's customer premises equipment supports AAL2 and to associate the second subscriber with AAL2/5 in response to determining that a second broadband distribution platform between the gateway and the second subscriber's customer premises equipment does not support AAL2.

3. The gateway of claim 1, further comprising a management module operable to associate the first subscriber with the first ATM adaptation layer in response to determining that a first broadband distribution platform between the gateway and the first subscriber's customer premises equipment supports the first ATM adaptation layer.

4. The gateway of claim 1, further comprising a management module operable to associate the first subscriber with the first ATM adaptation layer according to a type, content, priority, or other criteria of the first telecommunication information.

5. A gateway for communicating telecommunication information between a telecommunication network and customer premises equipment, the gateway comprising:

a telecommunication interface operable to receive first telecommunication information for a first subscriber and second telecommunication information for a second subscriber; and a packetization module operable to generate first ATM cells for communicating the first telecommunication information using a first ATM adaptation layer associated with the first subscriber and to generate second ATM cells for communicating the second telecommunication information using a second ATM adaptation layer associated with the second subscriber, wherein:
   the first ATM adaptation layer is a hybrid AAL2/5; and
   the packetization module generates the first ATM cells for communicating the first telecommunication information by generating AAL2 information encapsulating the first telecommunication information, generating the first ATM cells encapsulating the AAL2 information, and setting a field in each first ATM cell to indicate that each cell includes an end of a data unit.

6. The gateway of claim 5, wherein the packetization module sets a payload type field in each first ATM cell to "1" to indicate that each cell includes an end of a data unit.

7. A method of communicating telecommunication information between a telecommunication network and customer premises equipment, the method comprising:

receiving first telecommunication information for a first subscriber;

generating first ATM cells for communicating the first telecommunication information using a first ATM adaptation layer associated with the first subscriber;

receiving second telecommunication information for a second subscriber; and generating second ATM cells for communicating the second telecommunication information using a second ATM adaptation layer associated with the second subscriber, wherein the first ATM adaptation layer is AAL2 and the second ATM adaptation layer is a hybrid AAL2/5.

8. The method of claim 7, further comprising:

associating the first subscriber with AAL2 in response to determining that a first broadband distribution platform between the gateway and the first subscriber's customer premises equipment supports AAL2; and associating the second subscriber with AAL2/5 in response to determining that a second broadband distribution platform between the gateway and the second subscriber's customer premises equipment does not support AAL2.

9. The method of claim 7, further comprising:

determining that a first broadband distribution platform between the gateway and the first subscriber's customer premises equipment supports the first ATM adaptation layer; and associating the first subscriber with the first ATM adaptation layer in response to determining that the first broadband distribution platform support the first ATM adaptation layer.

10. The method of claim 7, further comprising associating the first subscriber with the first ATM adaptation layer according to a type, content, priority, or other criteria of the first telecommunication information.

11. A method of communicating telecommunication information between a telecommunication network and customer premises equipment, the method comprising:

receiving first telecommunication information for a first subscriber;

generating first ATM cells for communicating the first telecommunication information using a first ATM adaptation layer associated with the first subscriber;

receiving second telecommunication information for a second subscriber; and generating second ATM cells for communicating the second telecommunication information using a second ATM adaptation layer associated with the second subscriber, wherein:

the first ATM adaptation layer is a hybrid AAL2/5; and
generating the first ATM cells for communicating the first telecommunication information further comprises:

generating AAL2 information encapsulating the first telecommunication information;

generating the first ATM cells encapsulating the AAL2 information; and setting a field in each first ATM cell to indicate that each cell includes an end of a data unit.

12. The method of claim 11, wherein setting the field in each first ATM cell to indicate that each cell includes an end of a data unit further comprises setting a payload type field in each first ATM cell to "1".

13. A gateway for communicating telecommunication information between a telecommunication network and customer premises equipment, the gateway operable to receive telecommunication information from the telecommunication network for communication to the customer premises equipment, the gateway further operable to generate AAL2 information encapsulating the telecommunication information, to generate ATM cells encapsulating the AAL2 information, to set a field in each ATM cell to indicate that each cell includes an end of a data unit, and to communicate the ATM cells to the customer premises equipment.

14. The gateway of claim 13, wherein the gateway sets a payload type field in each ATM cell to "1" to indicate that each cell includes an end of a data unit.

15. The gateway of claim 13, wherein the gateway is further operable to communicate the ATM cells to the customer premises equipment using DSL, cable, wireless, or other broadband distribution platforms.

16. A method of communicating telecommunication information between a telecommunication network and customer premises equipment, the method comprising:

receiving telecommunication information from the telecommunication network for communication to the customer premises equipment;

generating AAL2 information encapsulating the telecommunication information;

generating ATM cells encapsulating the AAL2 information;

setting a field in each ATM cell to indicate that each cell includes an end of a data unit; and communicating the ATM to the customer premises equipment.

17. The method of claim 16, wherein setting the field in each ATM cell to indicate that each cell includes an end of a data unit further comprises setting a payload type field in each first ATM cell to "1".

18. The method of claim 16, further comprising communicating the ATM cells to the customer premises equipment using DSL, cable, wireless, or other broadband distribution platforms.

* * * * *

UNITED STATES PATENT AND TRADEMARK OFFICE
CERTIFICATE OF CORRECTION

PATENT NO.    : 6,526,046 B1
DATED         : February 25, 2003
INVENTOR(S)   : A.J. Paul Carew It is certified that error appears in the above-identified patent and that said Letters Patent is hereby corrected as shown below:

Column 16,
Line 42, after "ATM" insert -- cells --.

Signed and Sealed this

Tenth Day of June, 2003

JAMES E. ROGAN
*Director of the United States Patent and Trademark Office*